United States Patent [19]

Rabinkin

[11] Patent Number: 4,928,872
[45] Date of Patent: May 29, 1990

[54] METHOD OF BRAZING EMPLOYING BAG-GROUP HOMOGENEOUS MICROCRYSTALLINE BRAZING POWDERS

[75] Inventor: Anatol Rabinkin, Morris Plains, N.J.
[73] Assignee: Allied-Signal Inc., Morris Township, Morris County, N.J.
[21] Appl. No.: 319,376
[22] Filed: Mar. 6, 1989

Related U.S. Application Data

[62] Division of Ser. No. 97,016, Sep. 14, 1987, Pat. No. 4,842,955.
[51] Int. Cl.$^5$ ........................ B23K 35/14; B23K 35/28
[52] U.S. Cl. .................................... 228/203; 228/248; 148/24; 164/463
[58] Field of Search .................... 228/248, 263.11, 203, 228/193, 195, 56.3; 164/463, 462, 479, 423, 429; 148/24, 403

[56] References Cited

U.S. PATENT DOCUMENTS 4,448,853  5/1984  Fischer et al. ...................... 228/56.3
4,528,247  7/1985  Mizuhara ............................. 148/403
4,805,686  2/1989  Skinner et al. ........................ 164/479

FOREIGN PATENT DOCUMENTS 1100065  6/1984  U.S.S.R. ............................... 228/195

Primary Examiner—Nicholas P. Godici
Assistant Examiner—Samuel M. Heinrich
Attorney, Agent, or Firm—Gus T. Hampilos

[57] ABSTRACT

A brazing process is disclosed for joining two or more metal parts. The metal parts are brazed by interposing between the parts to be joined a brazing paste composed of a homogeneous microcrystalline rapidly solidified alloy powder having a composition consisting essentially of about 15 to 40 weight percent copper, 0 to 32 weight percent zinc, 0 to 24 weight percent cadmium, 0 to 3 weight percent nickel and 0 to 10 weight percent tin, the balance being silver and incidental impurities, and a phase structure such that the largest dimension of any precipitated phase ranges from about 0.01 to 0.1 micrometer, heating the powder to melt the powder, and thereafter cooling the parts to produce a brazed product. The brazing process can be carried out at lower temperatures as compared to prior art processes employing conventional BAg-alloy powders.

1 Claim, 7 Drawing Sheets

METHOD OF BRAZING EMPLOYING BAG-GROUP HOMOGENEOUS MICROCRYSTALLINE BRAZING POWDERS

This application is a division, of application Ser. No. 097,016, filed Sept. 14, 1987 now U.S. Pat. No. 4,842,955.

1. FIELD OF THE INVENTION

This invention relates to brazing process employing microcrystalline metal alloys and, more particularly, to homogeneous, microcrystalline, rapid solidified brazing materials in powder form, useful for brazing ferrous and non-ferrous metal articles.

2. DESCRIPTION OF THE PRIOR ART

Brazing is a process for joining metal parts, often of dissimilar composition, to each other. Typically, a filler metal that has a melting point lower than that of the metal parts to be joined together is interposed between the metal parts to form an assembly. The assembly is then heated to a temperature sufficient to melt the filler metal. Upon cooling, a strong, leaktight joint is formed. Filler metals used are commonly in powder, wire or foil form, depending on the type of application.

Filler metals in powder form are utilized as brazing pastes with a fluid medium to be simultaneously a powder carrier and valuable brazing flux. Brazing filler metal paste is simple to prepare and it may be universally used for variety of joints geometries and tolerances. It also may be used in highly productive automated feeding paste equipment. Most of the silver-base brazing filler metals (so-called BAg-series according to American Welding Society specification A5.8-76) are widely used in the powder form. Silver-base powders, when mixed with various brazing fluxes comprise variety of silver-bearing pastes which may be used to braze most ferrous and non-ferrous base metals. BAg-series alloys contain more than 30 wt. % silver and copper with balance composed of cadmium, zinc and small additions of nickel or tin. In the solid state, these alloys have notably high ductility due to the inherent ductility of the constituent alloying elements and the absence of brittle phases forming on solidification. Therefore BAg-series alloys are exceptionally malleable and cannot be easily subjected to grinding into powder forms. The conventional method of producing fine powders from these alloys is to direct high velocity gas jets at a stream of liquid metal, breaking the stream into small droplets. This process is called gas atomization. The process has inherent deficiencies which include strong oxidation of powder, formation of pores inside droplets and strong variations in droplet sizes, which cannot be improved by subsequent grinding.

It is known that metal can be solidified into a thin amorphous or crystalline foil or strip using the planar flow process disclosed in the U.S. Pat. No. 4,331,739. In this process continuous metal strips are formed by forcing molten metal onto the surface of a moving chill body under pressure through a slotted nozzle located in close proximity to the surface of the chill body. Critical selection of nozzle dimensions, velocity of movement of the chill body and gap between nozzle and chill body surface permits production of continuous polycrystalline metal strip at high speed having a high degree of homogeneity. Modifying the above mentioned parameters of rapid solidification processing produces a different phase composition and crystalline microstructure in alloys having the same chemical composition. Therefore, in some instances an alloy may be manufactured in ductile or brittle form. Production of metastable brittle strip forms of BAggroup alloys suitable for grinding into powder has not been disclosed before. Further, application of rapid solidification to process highly volatile silver base brazing filler alloys having AWS BAg-group compositions into metastable, thin, brittle strip with uniform chemical homogeneity is not disclosed by Narasimhan. Consequently, there remains a need in the art for brazing materials of AWS BAg-group compositions which are clean, metastable, homogeneous and brittle and can be produced as a brittle strip especially adapted to be ground into powder in an economical, safe manner.

SUMMARY OF INVENTION

The present invention involves, initially, the production of a rapidly solidified brazing alloy of BAg-group composition into a clean, brittle, metastable and homogeneous strip product. This brittle strip product may be readily ground into the powder form using a ball mill or other mechanical devices. This powder, when mixed with standard fluxes is used as an improved brazing alloy paste. Brittleness of BAg-group alloys occurs on transformation into a new metastable state with ultrafine microstructure when solidified at high cooling rates. Generally stated, the method comprises the steps of forming a melt of the composition and quenching the melt on a rapidly moving chill surface at a rate of at least $10^5$ K/sec. In addition, the invention provides a homogeneous brittle ultrafine microcrystalline strip that has a thickness ranging from about 40–60 micrometers thick and is especially suited for grinding into powder having a composition consisting essentially of about 15 to 40 weight percent copper, 0 to 32 wt. % zinc, 0 to 24 wt. % cadmium, 0 to 3 wt. % nickel and 0 to 10 wt. % tin, the balance being silver and incidential impurities.

The invention is directed to a process for joining together two or more metal parts comprizing the steps of:

(a) placing a brazing paste between the parts to be joined to form an assembly, the brazing paste having a melting temperature less than that of any of the metal parts to be joined; (b) heating the assembly to at least the melting temperature of the brazing paste; and (c) cooling the assembly, wherein the improvement comprises employing as the metal powder, a homogeneous, microcrystaline alloy having a composition consisting essentially of about 15 to 40 weight percent copper, 0 to 32 wt. % zinc, 0 to 24 wt. % cadmium, 0 to 3 wt. % nickel and 0 to 10 wt. % tin, the balance being silver and incidential impurities.

BRIEF DESCRIPTION OF THE DRAWINGS

The invention will be more fully understood and further advantages will become apparent when reference is made to the following detailed description of the preferred embodiments of the invention and the accompanying drawings in which:

FIGS. 1a–5a are X-ray diffraction scans of brittle, rapidly solidified, thin, as-cast strips of alloys designated, respectively, as BAg-1, BAg-2a, BAg-3, BAg-4 and BAg-20 by the American Welding Society;

FIGS. 1b–5b are X-ray diffraction scans of the alloys of FIGS. 1a–6a after annealing at 200° for 64 hrs;

DETAILED DESCRIPTION OF THE INVENTION

Figure 1A:
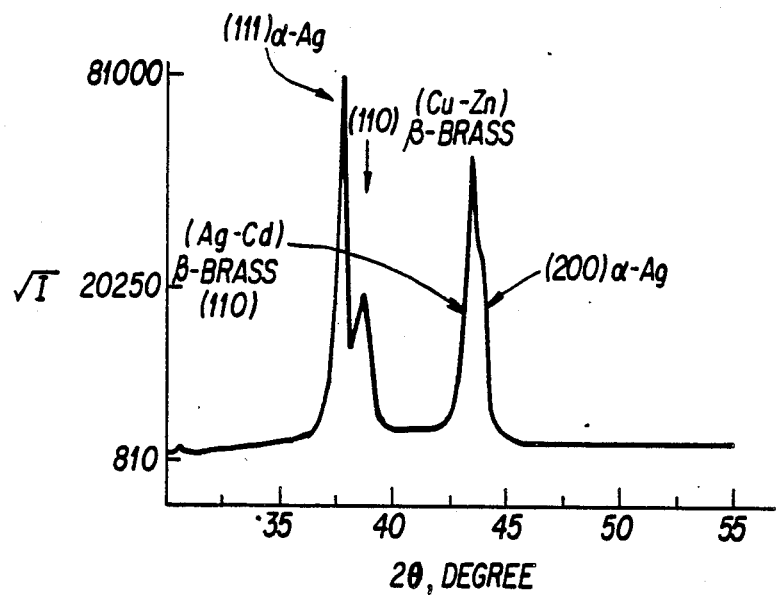
Figure 1B:
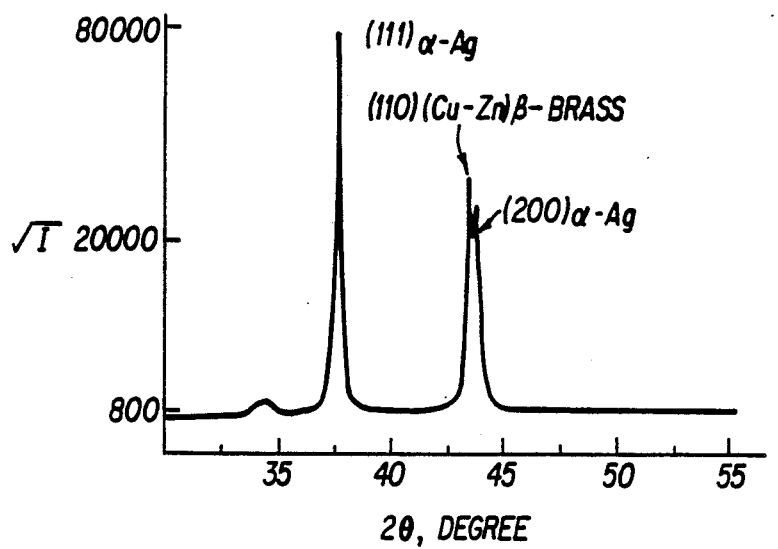
Figure 2A:
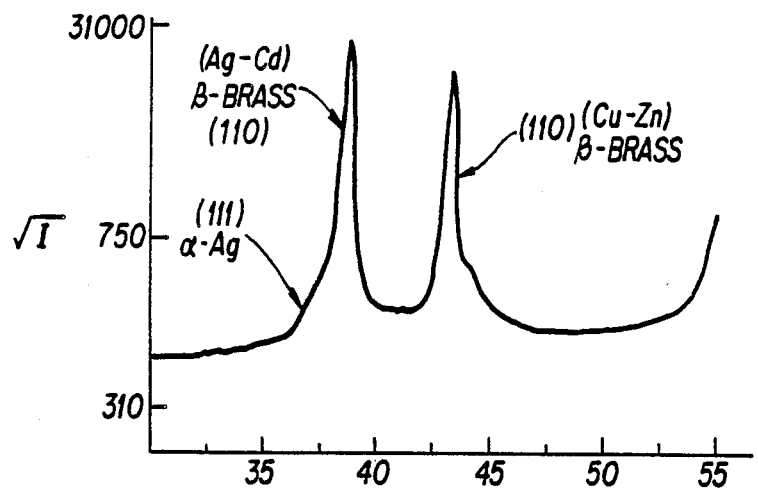
Figure 2B:
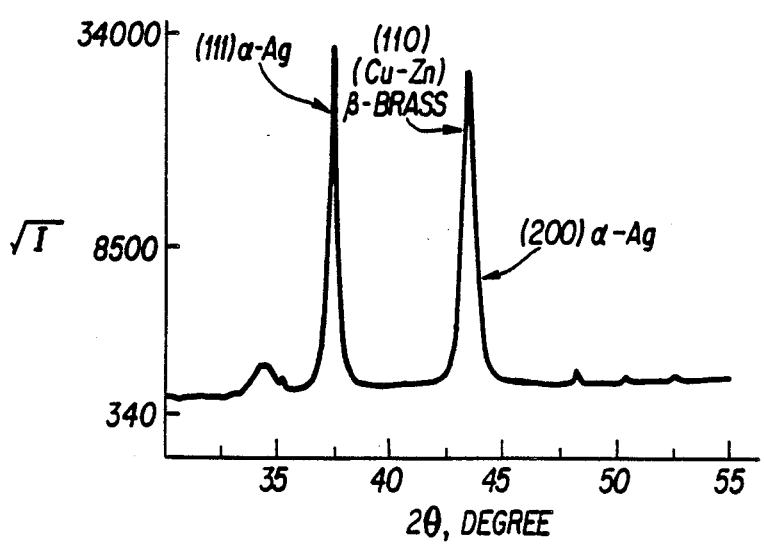
Figure 3A:
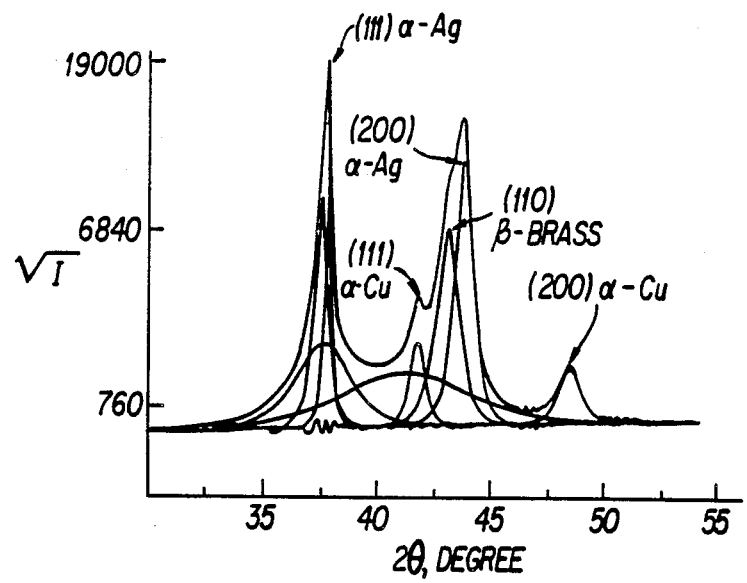
Figure 3B:
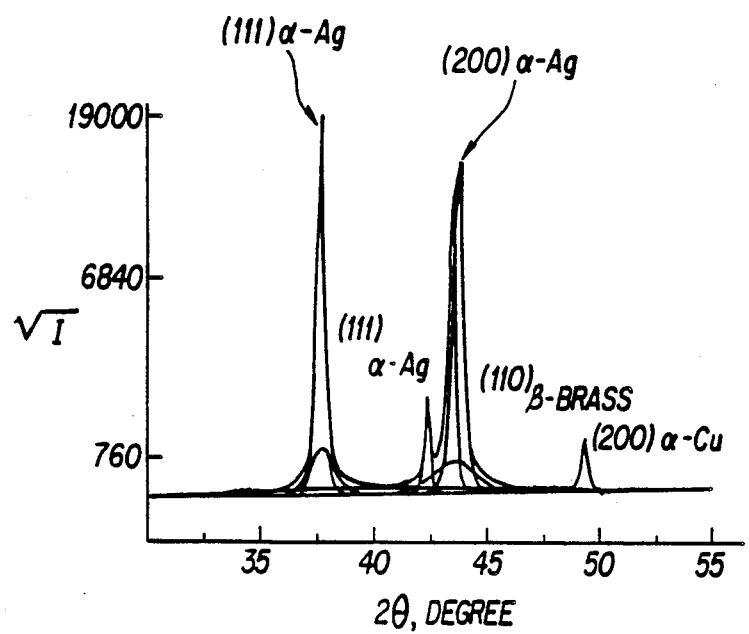
Figure 4A:
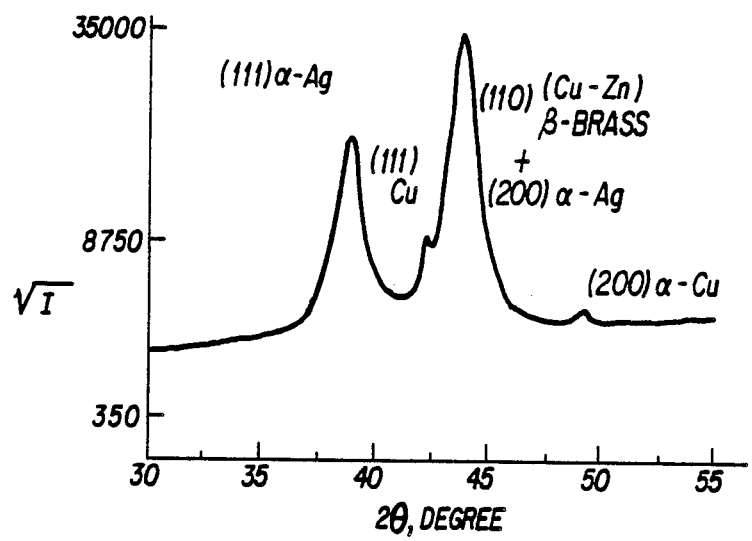
Figure 4B:
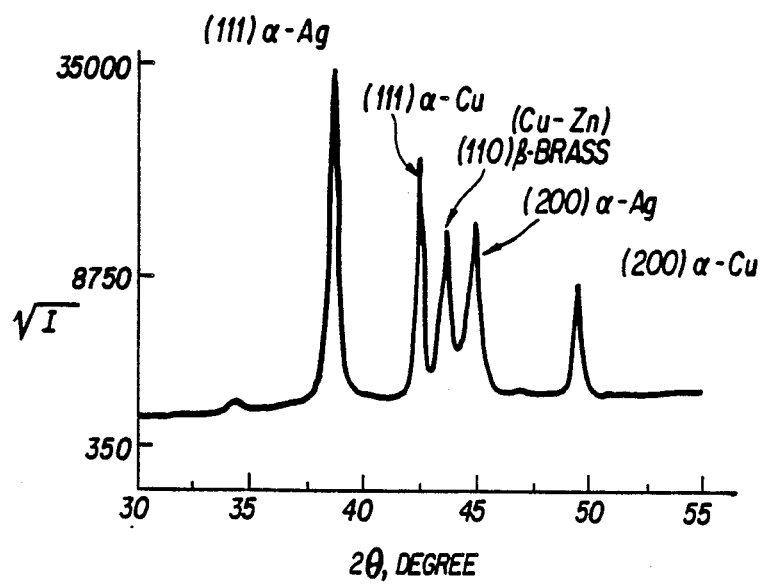
Figure 5A:
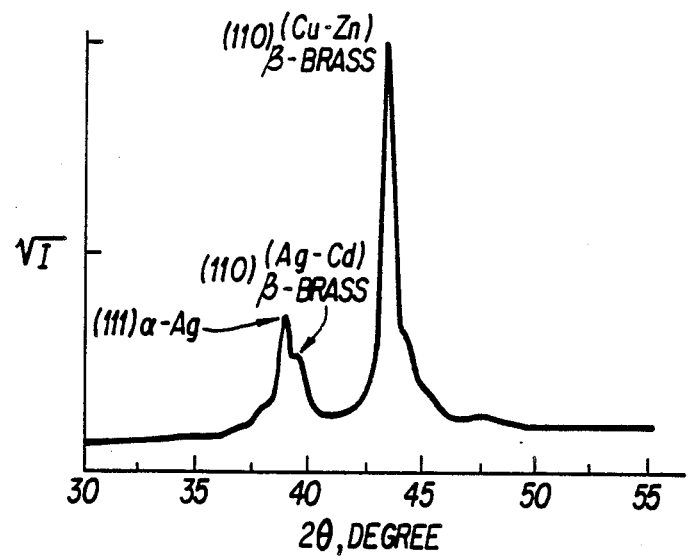
Figure 5B:
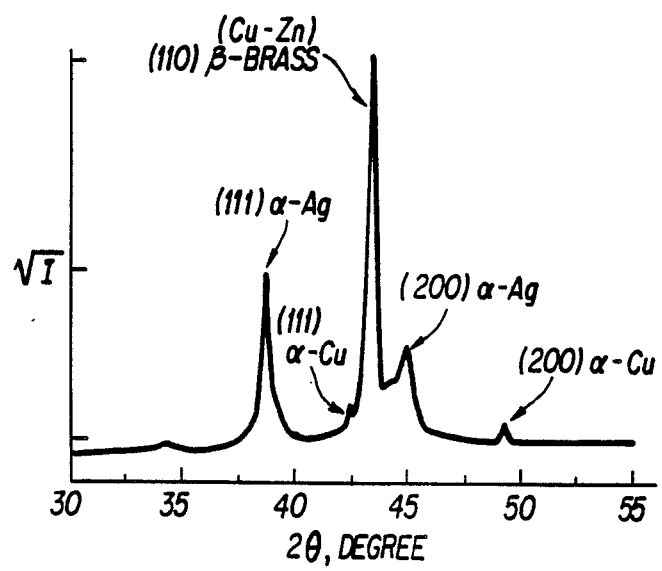

In accordance with the invention, a homogeneous, brittle, metastable, ultramicrocrystalline brazing material in thin (about 40–60 micrometers) strip form is provided which may be readily ground into the brazing powder from using a ball mill or other mechanical devices. The brittle strip has a composition consisting essentially of about 15 to 40 weight percent copper, 0 to 32 wt. % zinc, 0 to 24 wt. % cadmium, 0 to 3 wt. % nickel and 0 to 10 wt. % tin, the balance being silver and incidential impurities.

The term ultramicrocrystalline alloy, as used herein, means an alloy which, upon rapid solidification, has a phase structure in which the largest dimension of any precipitated phase is less than 0.1 $\mu$m (1000Å). Preferably, such an alloy has a phase structure such that the largest dimension of any precipitated phase ranges from about 0.01 micrometer to 0.1 micrometer, and most preferably from about 0.01 micrometer to 0.05 micrometer. The presence of such precipitate phases with the dimensions set forth hereinabove is required in order that the alloys of the invention be provided with a brittle fracture mode.

The term brittle, as used herein, means that the alloy strip can not be bent without cracking through a radius smaller than 0.8 mm (1/32 inch). Such a test provides a practical criterion for determining the brittleness of the thin strip of the present invention.

Ultramicrocrystalline alloys are formed by cooling a melt of the desired composition at a rate of at least $10^5$K/sec. A variety of rapid quenching techniques, well known to the microcrystalline alloy are available for producing microcrystalline powder, wire, ribbon and sheet. Typically, a particular composition is selected, powders or granules of the requisite elements in the desired portions are melted and homogenized, and the molten alloy is rapidly quenched on a chill surface, such as a rapidly rotating cylinder, or in a suitable fluid medium, such as water. Generally, in the case of multiphase brazing filler metals having the same composition the material, which has finer crystalline structure is melted in a narrower melting range and for a shorter time. Therefore, the finer the crystalline structure of a brazing material, the lower the brazing temperature, the higher the efficiency of the brazing equipment and the finer and more uniform the crystalline structure of brazed joint achieved. Furthermore, the brazing material must be in brittle strip form so that powder of a necessary size may be easily produced using a ball mill or other mechanical devices. Finally, the brazing powder should be homogeneous. By homogeneous is meant that the material, in strip form or in the form of produced powder made by grinding the strip exhibits spactial homogeneity in elemental distribution. This homogeneity is at least better than the resolution of modern scanning electron microscope, i.e., no difference of more than 1–2 weight percent in elemental distribution is observed on distances larger than 1 micrometer.

The brazing materials of the invention are compatible with a wide variety ferrous and non-ferrous base materials (specified in AWS A5.8 Specification for silver-base BAg-group of brazing filler metal) and are particularly suited for joining these materials. Examples of brazing alloy compositions within the scope of the invention are set forth in Table 1.

TABLE 1

| SAMPLE # | AWS Designation | Composition, wt. % | | | | | DUCTILITY |
|---|---|---|---|---|---|---|---|
| | | Ag | Cu | Zn | Cd | X | |
| 1 | BAg-1 | 45 | 15 | 16 | 24 | — | Brittle |
| 2 | BAg-2 | 35 | 26 | 21 | 18 | — | " |
| 3 | BAg-2a | 30 | 27 | 23 | 20 | — | " |
| 4 | BAg-3 | 50 | 15.5 | 15.5 | 16 | Ni 3.0 | " |
| 5 | BAg-4 | 40 | 30 | 28 | — | — | " |
| 6 | BAg-8 | 72 | 28 | — | — | — | " |
| 7 | BAg-13 | 54 | 40 | 5 | — | Ni 1.0 | " |
| 8 | BAg-18 | 60 | 30 | — | — | Sn 10.0 | " |
| 9 | BAg-20 | 30 | 38 | 32 | — | — | " |

The brazing materials with which the present invention is adapted to be used include all combinations elements present in AWS BAg-group brazing filler metals that contain about 30 to 72 weight percent of silver. Accordingly, the present invention permits any material recommended by The American Welding Society for BAg-group brazing metals having such silver concentration to be joined by means of conventional brazing operations.

Further, in accordance with the invention, an improved process for joining two or more metal parts is disclosed. The process comprises the steps of:

(a) placing a brazing paste composed of metal powder between the parts to form an assembly, the brazing paste having a melting temperature less than that of any of the parts;

(b) heating the assembly to at least the melting temperature of the metal powder; and (c) cooling the assembly.

The improvement comprises employing as the metal powder a powder manufactured by comminuting a clean homogeneous, metastable, brittle foil having a composition consisting essentially of about 15 to 40 weight percent copper, 0 to 32 weight percent zinc, 0 to 24 weight percent cadmium, 0 to 3 weight percent nickel and 0 to 10 weight percent tin, the balance being silver and incidental impurities. The powder is prepared mechanically from the strip which is, in turn, produced by rapid solidification from the melt at a quench rate of at least about $10^5$K/sec. The velocity of the surface and the molten metal flow rate through the nozzle orifice are adjusted during the casting operation such that there is solidified on the quench surface a ribbon having a thickness of about 40–60 micrometers. That is to say, the thickness of the solidified ribbon depends on the flow rate of molten metal through the nozzle orifice and the velocity of the quench surface. Typically, for solidified ribbon of about 40–60 micrometers thick, the flow rate of molten metal through the nozzle orifice ranges from about 10 to 150 gr/sec cm and the velocity of the quench surface ranges from about 10 to 30 m/sec (about 2700 to 6000 ft/min).

The thickness of the strip required to produce a homogeneous, metastable, brittle, ultramicrocrystalline alloy will be found to vary depending on the composition of the alloy, and the quenching conditions (i.e. flow rate of molten alloy through the nozzle and velocity of the quench surface) employed. In general, the transition between brittle and ductile fracture modes occurs with the range of strip thickness of about 40–60 micrometers, and preferably for strip having thickness less than about 45 micrometers.

Figure 7:
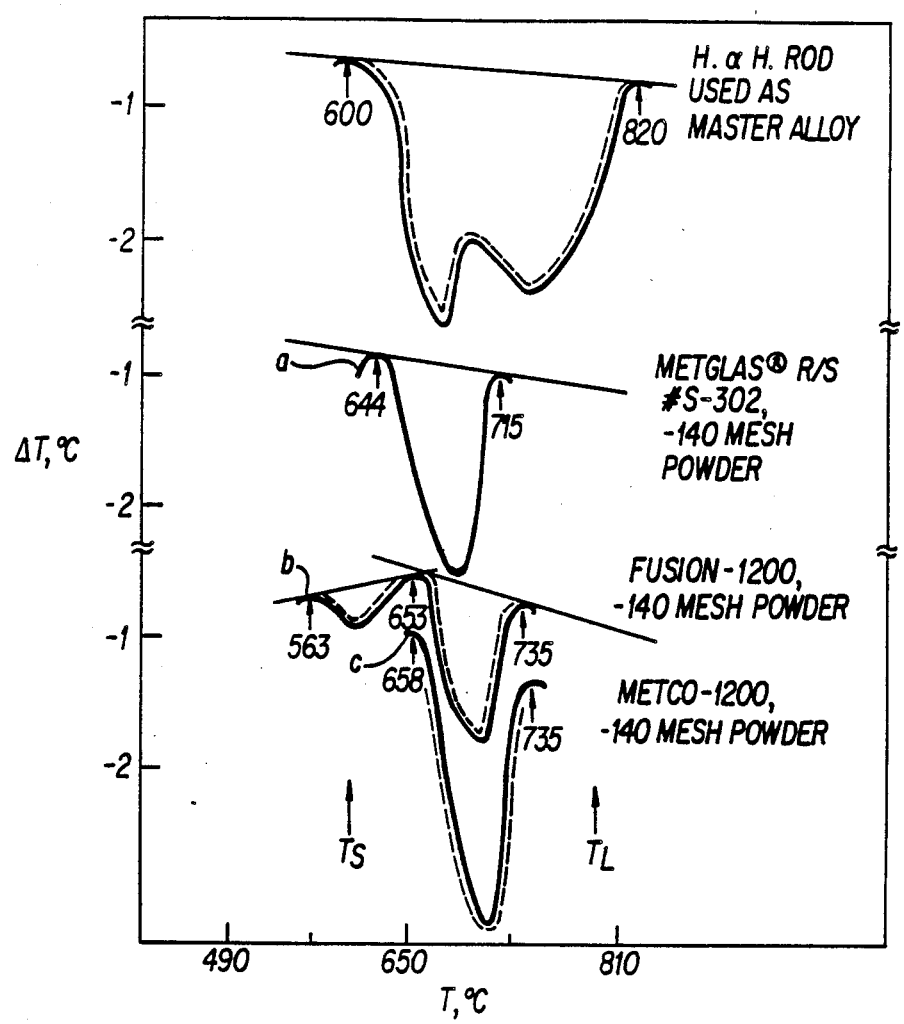
FIG. 7 shows melting throughs of BAg-3 powders, one of the powders, prepared from brittle as-cast R/S strip of silver-base alloy, being depicted by curve a and two other of the powders, prepared by gas atomization being shown by curves b and c.

Under these quenching conditions, a homogeneous, metastable, brittle, ultramicrocrystalline alloy is obtained. Such a metastable ultramicrocrystalline alloy can be sufficiently brittle to permit subsequent grinding into the powder with the particle size distribution in accordance with that of powders for preparation of brazing pastes. The brazing materials of the invention are advantageously produced in clean, homogeneous, metastable, microcrystalline form with melting characteristics (FIG. 7 curve a) superior to those of conventional gas atomized powders (FIG. 7, curves b and c). The melting throughs shown by FIG. 7, curves a, b and c were determined using a Perkin-Elmer model 3600 differential thermal analyzer. Brittle strips produced by the process described above are less than 60 micrometers thick and preferably about 10–50 micrometers thick, which thickness makes the dimensions of powder particles ground therefrom especially suited for use in brazing paste powders.

The following examples are presented in order to provide a more complete understanding of the invention. The specific techniques, conditions, materials and reported data set forth to illustrate the principles and practice of the invention are exemplary and should not be construed as limiting the scope of the invention.

EXAMPLE 1

Figure 6B:
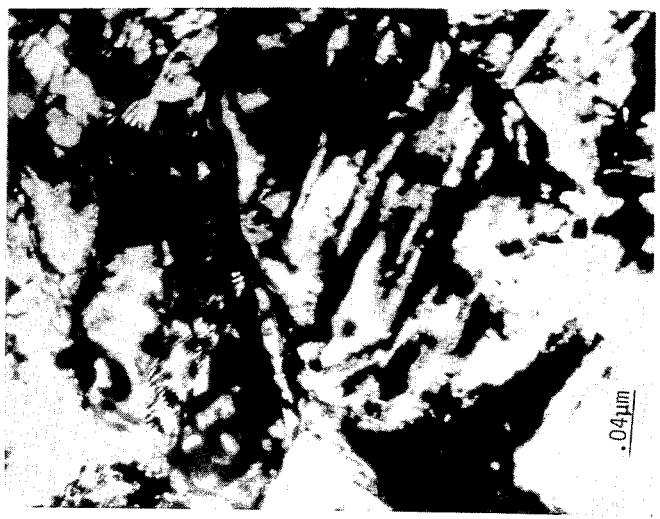
FIG. 6b is a STEM micrograph illustrating the changed structure of the formerly brittle but now ductile strip shown in FIG. 6a after annealing at 200° C. for 64 hrs.
Figure 6A:
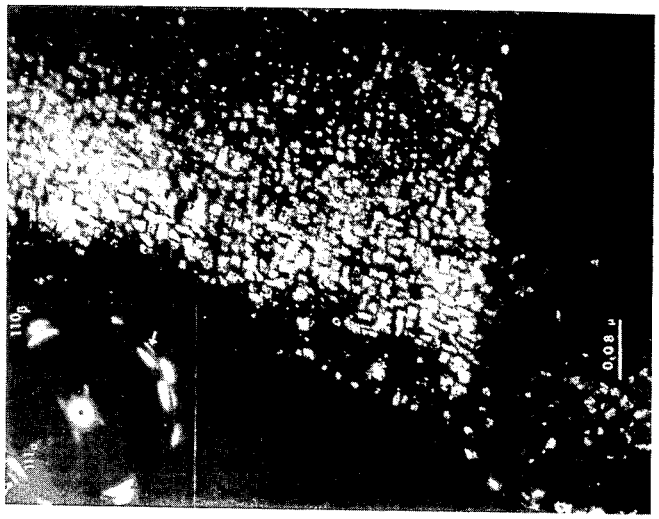
FIG. 6a is a scanning transmission electron microscope (STEM) micrograph depicting the ultrafine metastable crystalline structure of as-cast thin, 25 micrometers thick, brittle strip of silver-base alloy designated as BAg-3 by The American Welding Society.

Ribbons having the compositions set forth in Table 1 and being 1.27 cm (0.5 inch) wide and about 25 micrometers (about 0.001 inch) thick were formed by a melt of the particular composition by overpressure of argon onto a rapidly rotating copper chill wheel (surface speed about 30 m/sec or 6000 ft/min). Homogeneous ultramicrocrystalline alloy ribbons were produced, as shown in the STEM micrograph of FIG. 6a. The relatively coarse phase distribution existing in the annealed stable state and shown in FIG. 6b is seen to be refined into a homogenized ultramicrocrystalline structure by rapid solidification into a strip shown in FIG. 6a. The x-ray diffraction patterns of the new brittle structural states produced by rapid solidification are presented in FIGS. 1a–5a Diffraction patterns consisting of sets of narrow well resolved peaks characteristic of stable well annealed ductile samples (FIG. 1b–5b) are seen to be replaced by substantially different patterns of very broad peaks. This anomalous line width is due to the very small (in the order of a few hundred angstroms) size of crystal phases which are seen on FIG. 6a and high stresses created by precipitated particles. Very often not only line widths and intensities of the same phase are different but new metastable phases are present in the rapidly solidified thin strip form of alloys.

Fine particles precipitated in the matrix phase cause precipitation hardening of the alloys. This hardening is responsible for enhanced microhardness of a brittle alloy form which is in some cases twice as high as the corresponding annealed or conventionally rolled brazing foil forms. The hardness of the compositions was determined using a microhardness tester, and is set forth in Table II below.

TABLE II

MICROHARDNESS OF BRAZING FOILS OF BAg-3 COMPOSITION

| SAMPLE # | ALLOY DESIGNATION | ALLOY PROCESSING | VICKERS MICROHARDNESS (25 g load) | DUCTILITY |
|---|---|---|---|---|
| 1. | 4-11-50R | rapidly solidified as-cast 30 μm thick ribbon | 365 ± 23 | Brittle |
| 2. | 4-11-50R | the same as #1 annealed at 350° C., 24 h | 163 ± 17 | Ductile |
| 3. | D646 | rapidly solidified as-cast 45 μm thick ribbon | 358 ± 31 | Brittle |
| 4. | 4-11-53R | rapidly solidified as-cast 62 μm thick ribbon | 189 ± 15 | Ductile |
| 5. | Handy & Harman Easy Flo 45 | standard rolled 76 μm thick strip | 194 ± 20 | Ductile |

Each of the ribbons having the compositions set forth in Table I and having a thickness of about 25 micrometers was tested in accordance with the bend test set forth hereinabove and was determined to be brittle.

EXAMPLE 2

Thin brittle strip manufactured in accordance with the procedures described in Example 1 and having the composition of standard AWS BAg-3 alloy, namely 50Ag-15.5Cu-15.5Zn-16Cd-3Ni (wt. %) was placed and ground first in a standard hammer mill grinder and afterward in a rotary grinder. The resulting powder was sifted through standard sieves number 45 to 140. Distribution of powder sizes (U.S. standard sieves sizes) were as follows:

| | | |
|---|---|---|
| +45 | 16% | |
| −45 +140 | 44% | weight of original strip |
| −140 | 39% | |

Additional milling easily turned the coarse fraction of powder into the finer ones. No physical consolidation of particles due to cold working occured during the grinding.

The composition of produced powder was analyzed using 1CAP 9000 plasma emission spectroscope for determining metal components while concentration of oxygen, nitrogen and carbon were defined by using LECO TC-136 analyzer. Concentrations of basic elements and impurities of the powder produced from rapidly solidified strip together with that of conventional gas atomized powders are shown in Table III.

TABLE III

| ALLOY COMPOSITIONS (wt. %) | | | | |
|---|---|---|---|---|
| # | Alloy Designation | Ag | Cu | Zn |
| 1 | −140 mesh powder prepared from S 305 25 μm thick as-cast strip | 49.89 | 15.59 | 15.83 |
| 2 | Metco 1200 −140 mesh gas atomized powder | 50.52 | 16.43 | 14.95 |
| 3 | Fusion 1200 −140 mesh gas atomized powder | 50.96 | 15.84 | 13.99 |
|   | Nominal chemical composition for BAg-3 alloy according to AWS (wt. %) | 49–51 | 14.5–16.5 | 13.5–17.5 |

| Cd | Ni | $O_2$ | $N_2$ | C |
|---|---|---|---|---|
| 15.51 | 2.914 | 0.024 | 0.005 | 0.014 |
| 14.81 | 3.003 | 0.216 | 0.001 | 0.030 |
| 16.31 | 2.728 | 0.128 | 0.002 | 0.024 |
| 15–17 | 2.5–3.5 | Other elements 0.150 | | |

The analysis shows that the concentration of basic elements in produced powder is in accordance with the American Welding Society Specifications whereas advantageously the amount of harmful impurities, i.e. oxygen, nitrogen, and carbon is much smaller (oxygen concentration is five-eight times lower). That is to say that powder produced from strip is much cleaner. Moreover, the combined concentration of impurities in conventional alloys exceeds the level permited by AWS specifications, whereas the combined concentration of impurities contained by Sample #1 of Table III falls within permissible units specified by AWS. Further, the melting characteristics of above mentioned powders were determined by using a Perkin-Elmer 3600 differential thermal analyzer. The results, shown in FIG. 1 indicate that powder produced from brittle strip starts and completes melting at lower temperatures. In addition the temperature range where melting occurs is narrower than that of conventional gas atomized powders. That is to say that produced powder melts faster and more uniformly than gas atomized powders.

What is claimed is:

1. A process for joining together two or more metal parts, the process comprising the steps of:
   a. interposing between the parts to be joined a brazing paste comprising metal powder having a homogeneous, microcrystalline structure, a composition consisting essentially of about 15 to 40 weight percent copper, 0 to 32 weight percent zinc, 0 to 24 weight percent cadmium, 0 to 3 weight percent nickel, 0 to 10 weight percent tin, and the balance being silver and incidental impurities, and a phase structure such that the largest dimension of any precipitated phase ranges from about 0.01 to 0.1 micrometer;
   b. heating to cause substantially complete melting of the metal powder; and
   c. cooling the melted powder to produce a brazed joint between the parts.

* * * * *